(12) United States Patent
Cui et al.

(10) Patent No.: US 10,801,311 B1
(45) Date of Patent: Oct. 13, 2020

(54) ELECTRIC DRIVE FRACTURING POWER SUPPLY SEMI-TRAILER

(71) Applicant: YANTAI JEREH PETROLEUM EQUIPMENT & TECHNOLOGIES CO., LTD., Yantai (CN)

(72) Inventors: Shuzhen Cui, Yantai (CN); Rikui Zhang, Yantai (CN); Dong Liu, Yantai (CN)

(73) Assignee: Yantai Jereh Petroleum Equipment & Technologies Co., Ltd., Yantai (CN)

(*) Notice: Subject to any disclaimer, the term of this patent is extended or adjusted under 35 U.S.C. 154(b) by 0 days.

(21) Appl. No.: 16/834,433

(22) Filed: Mar. 30, 2020

(30) Foreign Application Priority Data

Jun. 13, 2019 (CN) .......................... 2019 1 0510839

(51) Int. Cl.
*E21B 43/26* (2006.01)
*H02P 5/74* (2006.01)
*F04B 17/03* (2006.01)
*B62D 53/06* (2006.01)
*H02M 7/44* (2006.01)
*H02M 7/04* (2006.01)

(52) U.S. Cl.
CPC .......... *E21B 43/2607* (2020.05); *B62D 53/06* (2013.01); *F04B 17/03* (2013.01); *H02P 5/74* (2013.01); *H02M 7/04* (2013.01); *H02M 7/44* (2013.01)

(58) Field of Classification Search
CPC ..... E21B 43/26; E21B 43/2607; B61D 53/06; F04B 17/03; H02P 5/74; H02M 7/04
See application file for complete search history.

(56) References Cited

U.S. PATENT DOCUMENTS

2019/0169971 A1* 6/2019 Oehring .................. E21B 43/26

* cited by examiner

*Primary Examiner* — Robert L Deberadinis

(57) ABSTRACT

The present invention discloses an electric drive fracturing power supply semi-trailer, which can separately drive multiple high voltage inversion units and multiple low voltage inversion unit, through a common DC bus, by employing a high voltage switch, a transformer and two sets of rectifying units. The electric drive fracturing power supply semi-trailer is small in size, compact in layout and economical. The high voltage switch, the transformer, and the rectifying units are shared to decrease the wirings of power supply lines, thus reducing the number of equipment and capital investment, and better meeting the usage requirements.

7 Claims, 1 Drawing Sheet

ELECTRIC DRIVE FRACTURING POWER SUPPLY SEMI-TRAILER

TECHNICAL FIELD

The present invention relates to the technical field of fracturing in oil and gas fields, and specifically to an electric drive fracturing power supply semi-trailer.

BACKGROUND

In a configuration mode of a power transmission system used in conventional fracturing equipment on fracturing sites in oil and gas fields all over the world, a diesel engine is connected to a transmission to drive a fracturing plunger pump through a transmission shaft to work. This configuration mode has the following disadvantages: (1) Large volume and heavy weight: When the diesel engine drives the transmission to drive the fracturing plunger pump through the transmission shaft, a large volume is occupied, a heavy weight is involved, the transportation is restricted, and the power density is low. (2). Environmental problems: During operation on a well site, the fracturing equipment driven by the diesel engine would generate engine waste gas pollution and noise pollution. The noise exceeding 105 dBA will severely affect the normal life of nearby residents. (3). Cost inefficiency: The fracturing equipment driven by the diesel engine requires relatively high initial purchase costs and incurs high fuel consumption costs for unit power during operation, and the engine and the transmission also require very high routine maintenance costs. Efforts are made globally to manufacture oil and gas exploitation equipment with "low energy consumption, low noise, and low emission". Therefore, the foregoing disadvantages of the conventional fracturing equipment that uses the diesel engine as the power source impedes the exploitation progress of unconventional oil and gas sources to some extent.

It is a good solution for replacement of conventional diesel engine driven equipment with electric drive equipment. In the existing electric drive technologies, the power supply part of electric drive equipment includes multiple rectifying units corresponding to multiple transformers respectively, and each transformer is controlled with a high voltage switch. In practical applications, when multiple rectifying units are needed for operation, the corresponding multiple transformers should be allocated on-site for this mode. This would result in equipment gathering on-site, and large areas are occupied, causing great energy consumption, energy inefficiency, and non-environmentally friendliness.

Therefore, an electric drive fracturing power supply semi-trailer is urgently needed that has a compact structure, and is small in size, energy-efficient, and environmentally friendly.

SUMMARY

To overcome the deficiencies in the prior art, an objective of the present invention is to provide an electric drive fracturing power supply semi-trailer. A high-power transformer is used to drive multiple inversion units. The equipment has a compact structure and is small in size, effectively reducing the occupied area, thereby significantly improving the output power of the power supply equipment and better satisfying the use requirements.

The objective of the present invention is achieved by the following technical measures: an electric drive fracturing power supply semi-trailer, including a semi-trailer, a high voltage switch, a transformer, a rectifying unit and inversion units. The high voltage switch, the transformer and the rectifying unit are integrated on the semi-trailer. There are one high voltage switch and one transformer. The rectifying unit includes a high voltage rectifying unit and a low voltage rectifying unit. The high voltage switch is used to control the transformer. The high voltage side of the transformer is connected to the high voltage rectifying unit, the low voltage side of the transformer is connected to the low voltage rectifying unit. The one transformer drives the high voltage rectifying unit and the low voltage rectifying unit simultaneously. There are multiple inversion units, the inversion units include high voltage inversion units and low voltage inversion units. The high voltage rectifying unit drives the high voltage inversion unit, and the low voltage rectifying unit drives the low voltage inversion unit.

Further, the transformer is a multiwinding transformer.

Further, the power of the transformer is 10 MVA or above.

Further, the inversion unit has a compartment structure provided with two sets of inverters therein, and the two sets of inverters separately drive the two electric motors to work.

Further, the rectifying unit is connected to the inversion unit through a common DC bus, the common DC bus can separately drive multiple high voltage inversion units and multiple low voltage inversion units.

Further, the rectifying unit is disposed on a gooseneck of the power supply semi-trailer body.

Compared with the prior art, the beneficial effects of the present invention are as follows:

one high voltage switch, one transformer and two sets of rectifying units are employed to drive multiple high voltage inversion units and multiple low voltage inversion units separately through a common DC bus. The electric drive fracturing power supply semi-trailer is small in size, compact in layout and economical. The high voltage switch, the transformer, and the rectifying unit are shared to decrease the wirings of power supply lines, thus reducing the number of equipment and capital investment, and better meeting the usage requirements.

The present invention will be described in detail below with reference to the accompanying drawings and specific implementations.

Wherein, 1. semi-trailer body, 2. high voltage switch, 3. transformer, 4. rectifying unit, 5. high voltage inversion unit, 6. rectifier cabinet, 7. junction box, and 8. voltage transformation chamber.

DESCRIPTION OF THE EMBODIMENTS

Figure 1:
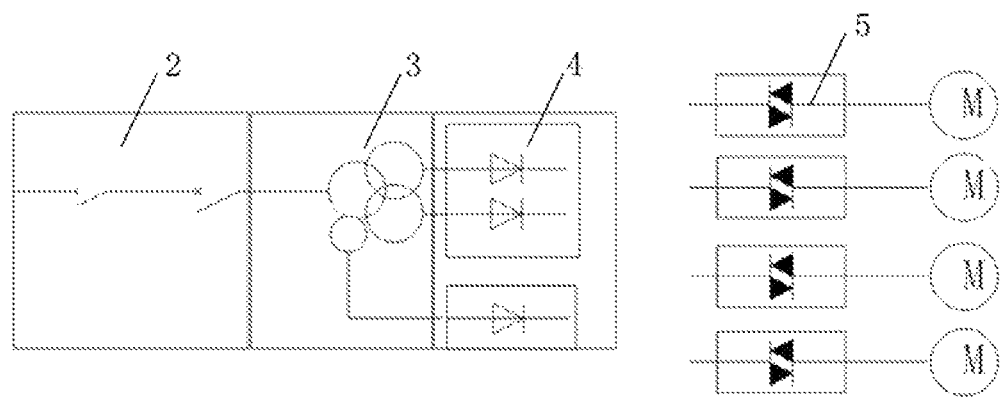
FIG. 1 is a schematic diagram of a power supply semi-trailer.
Figure 2:
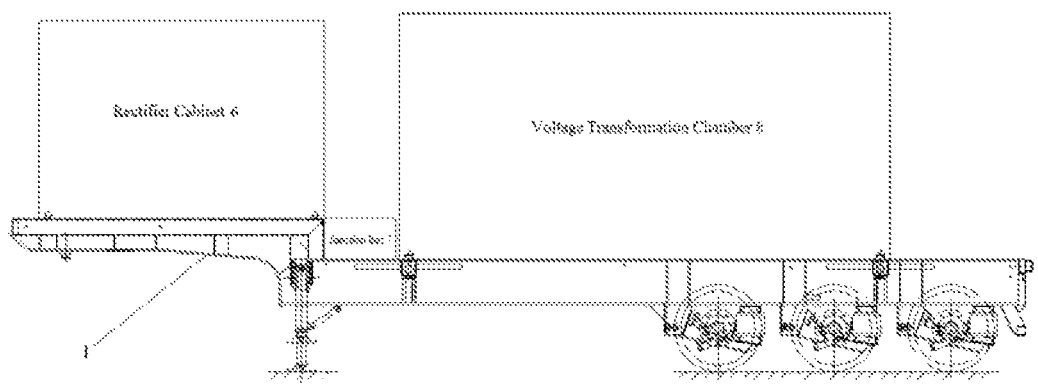
FIG. 2 is a schematic structural diagram of a power supply semi-trailer.

As shown in FIGS. 1 to 2, an electric drive fracturing power supply semi-trailer, including a power supply semi-trailer body 1, a high voltage switch 2, a transformer 3, a rectifying unit 4 and inversion units. The high voltage switch 2, the transformer 3 and the rectifying unit 4 are integrated on the power supply semi-trailer body 1. There are one high voltage switch 2 and one transformer 3. The rectifying unit 4 includes a high voltage rectifying unit and a low voltage rectifying unit. The high voltage switch 2 is used to control the transformer 3. The high voltage side of the transformer 3 is connected to the high voltage rectifying unit, the low voltage side of the transformer 3 is connected to the low voltage rectifying unit. The one transformer 3 drives the high voltage rectifying unit and the low voltage rectifying unit simultaneously; there are multiple inversion units, the inversion units include high voltage inversion units 5 and low voltage inversion units. The high voltage rectifying unit drives the high voltage inversion unit 5, and the low voltage rectifying unit drives the low voltage inversion unit. The transformer 3 is a multiwinding transformer. A set of multiwinding transformer is used, instead of multiple sets of transformer 3, to drive multiple sets of rectifying units 4 to effectively reduce the volume of equipment. All sets of equipment are disposed on the power supply semi-trailer body 1, thereby achieving easier arrangement on a well site and more convenient transportation.

For ensuring to drive multiple rectifying units 4, the power of the transformer 3 is 10 MVA or above. The high voltage rectifying units and the low voltage rectifying units match with the power of the transformer 3, thus enabling the high voltage rectifying units to drive more than four electric motors of 3000 kW or above. Each electric motor can drive a plunger pump of 4000 hp or above. The low voltage rectifying unit can drive more than two electric motors with a power of 355 kW or above, significantly improving the output power of the power supply semi-trailer and better satisfying the use requirements.

The power supply semi-trailer body 1 is provided with a rectifier cabinet 6, a junction box 7 and a voltage transformation chamber 8. The rectifier cabinet 6 is disposed on the gooseneck of the power supply semi-trailer body 1. The voltage transformation chamber 8 is disposed on the body of the power supply semi-trailer body 1. The junction box 7 is disposed between the rectifier cabinet 6 and the voltage transformation chamber 8. The rectifying unit 4 is disposed in the rectifier cabinet 6. The high voltage switch 2 and the transformer 3 are disposed in the voltage transformation chamber 8. The junction box 7 is used to accommodate the common DC bus.

The inversion unit has a compartment structure provided with two sets of inverters therein, and the two sets of inverters separately drive two electric motors to work. The high voltage inversion units 5 are integrated on a gooseneck of another semi-trailer body. Specifically, the high voltage inversion units 5 are disposed on the gooseneck of the electric drive fracturing semi-trailer, optimizing the spatial arrangement of equipment. In practical applications, the output end of the power supply semi-trailer provides electric driving force for the electric drive fracturing semi-trailer. The electric drive fracturing semi-trailer is provided with an electric motor, a plunger pump, and a lubricating and cooling system. The power supply semi-trailer drives the electric motor on the electric drive fracturing semi-trailer, (the inverter in each inversion unit can drive an electric motor to work indepently), the electric motor then drives the plunger pump to work. The lubricating and cooling system is used to cool lubricating oil in the plunger pump.

The rectifying unit 4 is connected to the inversion unit through a common DC bus. The common DC bus can drive multiple high voltage inversion units 5 and multiple low voltage inversion units separately. Connection through a common DC bus simplifies the wirings of power supply lines efficiently.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof

What is claimed is:

1. An electric drive fracturing power supply semi-trailer, comprising a semi-trailer body, a high voltage switch, a transformer, a rectifying unit and inversion units, wherein the high voltage switch, the transformer and the rectifying unit are integrated on the semi-trailer body, there are one high voltage switch and one transformer, the rectifying unit comprises a high voltage rectifying unit and a low voltage rectifying unit, the high voltage switch is used to control the transformer, the high voltage side of the transformer is connected to the high voltage rectifying unit, the low voltage side of the transformer is connected to the low voltage rectifying unit, the one transformer drives the high voltage rectifying unit and the low voltage rectifying unit simultaneously; there are multiple inversion units, the inversion units comprise high voltage inversion units and low voltage inversion units, the high voltage rectifying unit drives the high voltage inversion unit, and the low voltage rectifying unit drives the low voltage inversion unit.

2. The electric drive fracturing power supply semi-trailer according to claim 1, wherein the transformer is a multiwinding transformer.

3. The electric drive fracturing power supply semi-trailer according to claim 1, wherein the power of the transformer is 10 MVA or above.

4. The electric drive fracturing power supply semi-trailer according to claim 1, wherein the voltage of the high voltage rectifying unit is 3000 VDC or above.

5. The electric drive fracturing power supply semi-trailer according to claim 1, wherein the inversion unit has a compartment structure provided with two sets of inverters therein, and the two sets of inverters separately drive the two electric motors to work.

6. The electric drive fracturing power supply semi-trailer according to claim 1, wherein the rectifying unit is connected to the inversion unit through a common DC bus, the common DC bus can separately drive multiple high voltage inversion units and multiple low voltage inversion units.

7. The electric drive fracturing power supply semi-trailer according to claim 1, wherein the rectifying unit is disposed on a gooseneck of the power supply semi-trailer body.

* * * * *